United States Patent
Rodgers et al.

(10) Patent No.: US 7,680,561 B2
(45) Date of Patent: Mar. 16, 2010

(54) METHOD OF FACILITATING COMMUNICATIONS ACROSS OPEN CIRCUIT BREAKER CONTACTS

(75) Inventors: Barry Noel Rodgers, Raleigh, NC (US); Andy Allen Haun, Raleigh, NC (US); Robert Joseph Dwulet, Wake Forrest, NC (US); Mark John Kocher, Raleigh, NC (US); Julius Michael Liptak, Knightdale, NC (US); Alexander Filippenko, Cary, NC (US); Scott Robert Brown, Wake Forrest, NC (US); Gary Myron Kuzkin, Raleigh, NC (US); Gary W. Scott, Mount Vernon, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 658 days.

(21) Appl. No.: 11/520,904

(22) Filed: Sep. 14, 2006

(65) Prior Publication Data

US 2007/0008076 A1   Jan. 11, 2007

Related U.S. Application Data

(62) Division of application No. 10/972,508, filed on Oct. 25, 2004, now abandoned.

(60) Provisional application No. 60/513,962, filed on Oct. 24, 2003.

(51) Int. Cl.
*G05B 11/01* (2006.01)

(52) U.S. Cl. .............. 700/295; 340/310.11; 340/310.16

(58) Field of Classification Search ................ 700/295; 340/310.11, 310.16
See application file for complete search history.

(56) References Cited

U.S. PATENT DOCUMENTS

| | | | |
|---|---|---|---|
| 6,356,426 B1 * | 3/2002 | Dougherty | 361/102 |
| 6,671,148 B2 * | 12/2003 | Evans et al. | 361/64 |
| 2003/0171851 A1 * | 9/2003 | Brickfield et al. | 700/286 |
| 2004/0024475 A1 * | 2/2004 | Berkcan et al. | 700/22 |

\* cited by examiner

*Primary Examiner*—Ryan A Jarrett

(57) ABSTRACT

An intelligent power management system that includes a circuit breaker containing a PLC module that spans open contacts of the circuit breaker to provide a communication path for PLC messages between communication paths on each of the line and load sides of the circuit when the contacts are open. The contacts are motorized to permit remote operation through PLC messaging. Coupled to the PLC module is a controller, which controls the opening and closing of the motorized contacts under user control or via an adaptive load management algorithm that reduces peak power consumption and adapts a set of loads to changed power supply conditions. The controller can also dynamically alter operational current and fault threshold levels on a real-time basis based upon circuit requirements or environmental conditions. The algorithm runs a state machine and also manages loads in a limited power source environment such as when loads are powered by a generator.

26 Claims, 7 Drawing Sheets

METHOD OF FACILITATING COMMUNICATIONS ACROSS OPEN CIRCUIT BREAKER CONTACTS

CROSS-REFERENCE TO RELATED APPLICATION

This application is a divisional under 35 U.S.C. §121 of U.S. application Ser. No. 10/972,508, filed Oct. 25, 2004,now abandoned which claims priority to provisional Application Ser. No. 60/513,962, filed Oct. 24, 2003.

FIELD OF THE INVENTION

This invention is directed generally to power management control systems, and more particularly, to circuit breakers used in intelligent power management control system.

BACKGROUND OF THE INVENTION

Circuit breakers have long been used in industrial and residential applications to prevent damage to the loads connected to them and the building structures in which the loads are located. Normally, when an electrical fault or a current overload condition is sensed in a particular circuit, the breaker protecting that circuit "trips" and creates a physical disconnect in the circuit, thereby preventing the flow of electricity. To resume electrical flow to the circuit, the operator must physically reconnect the circuit breaker, typically by throwing a mechanical switch back to a closed position. These detection systems work automatically, tripping circuits only when certain conditions are satisfied.

However, an energy supplier or consumer may want to control energy flow deliberately to certain loads or circuits at such times as are desired, even when no fault or overload condition is detected. To do so, some way of remotely controlling the connections across the loads must be provided. But in the case of power line communication techniques, communication with any devices on the load side of the circuit breaker cannot occur if it has been tripped or if the electrical contacts inside the circuit breaker are otherwise separated. Thus, as soon as a circuit breaker trips, no further data can be collected on electrical devices connected to that circuit breaker nor can any further instructions be transmitted to change the behavior of the connected electrical devices. There is therefore a need to maintain the communication link from the utility or line side of the circuit breaker to the load side of the circuit breaker even when the circuit breaker has physically disconnected the branch circuit.

Another related need involves managing the loads or electrical devices connected to circuit breakers within a home or other facility in a way that is flexible and adaptable to both the homeowner and the power company. Homes typically can obtain their power from various sources, such as the power company, a backup generator, or an alternative power source like solar power arrays. Electrical devices (referred to as loads) within the home draw varying levels of electrical power at different times of the day and at different times of the year. Furthermore, electrical devices can be categorized and prioritized based on their consumption behavior (some loads cycle on and off throughout the day, other loads draw lots of power when they turn on) and importance (a life-saving medical device would be more critical than a swimming pool motor). For example, an oven can be used year-round and most frequently around dinnertime. An air conditioning unit can be used heavily during the summer months and not at all during the winter months. Data on the usage and properties of these and other electrical devices throughout the home can be collected over a period of time to create a set of historical data that reflects the usage patterns, usage frequency, usage levels of each device, and other properties about the electrical device.

During peak times in the summer months, the power company may wish to limit or reduce peak power consumption. Other emergency situations may call for a reduction or change in power consumption, such as adverse weather conditions or utility equipment failure. One approach to reducing power consumption is to initiate rolling blackouts, but this inconveniences homeowners and renders entire neighborhoods without power. What is needed, therefore, is an adaptive load management algorithm that overcomes these and other disadvantages. The present invention addresses this and other needs, as more fully described below.

SUMMARY OF THE INVENTION

Briefly, according to an embodiment of the present invention, an intelligent power load management and control system and method and an adaptive load management algorithm are described and shown. The system generally includes a circuit breaker that has a communications interface (specifically a PLC module in some embodiments) that spans the open contacts across the line and load sides of a circuit such that the communications interface can still communicate even when the circuit breaker is tripped or the contacts are otherwise in an open position. The communications interface can be adapted to interface messages compatible with PLC, Ethernet, RS-45, or wireless schemes. The circuit breaker can further include a DC voltage supply to supply power to the circuit breaker components in the event of a trip event or loss of utility power.

The circuit breaker contacts are motorized so that they can be opened and closed remotely. A web server, optionally housed within the circuit breaker, communicates with the controller to cause the contacts to be opened or closed based on an adaptive load management algorithm in a specific embodiment or other criteria in other embodiments. The web server can also be configured to adjust dynamically the operational current, fault, or trip threshold levels of the circuit breaker. The adaptive load management algorithm can predict the behavior of loads connected to the circuit using a neural network predictor. The algorithm can also be used to adaptively manage loads under limited power circumstances when the circuit is being powered by a backup power supply, such as a generator. The algorithm can be applied regardless of the source of a request for changed power supply conditions—those sources can originate from a utility power source, an alternate power source, and/or a backup power source.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
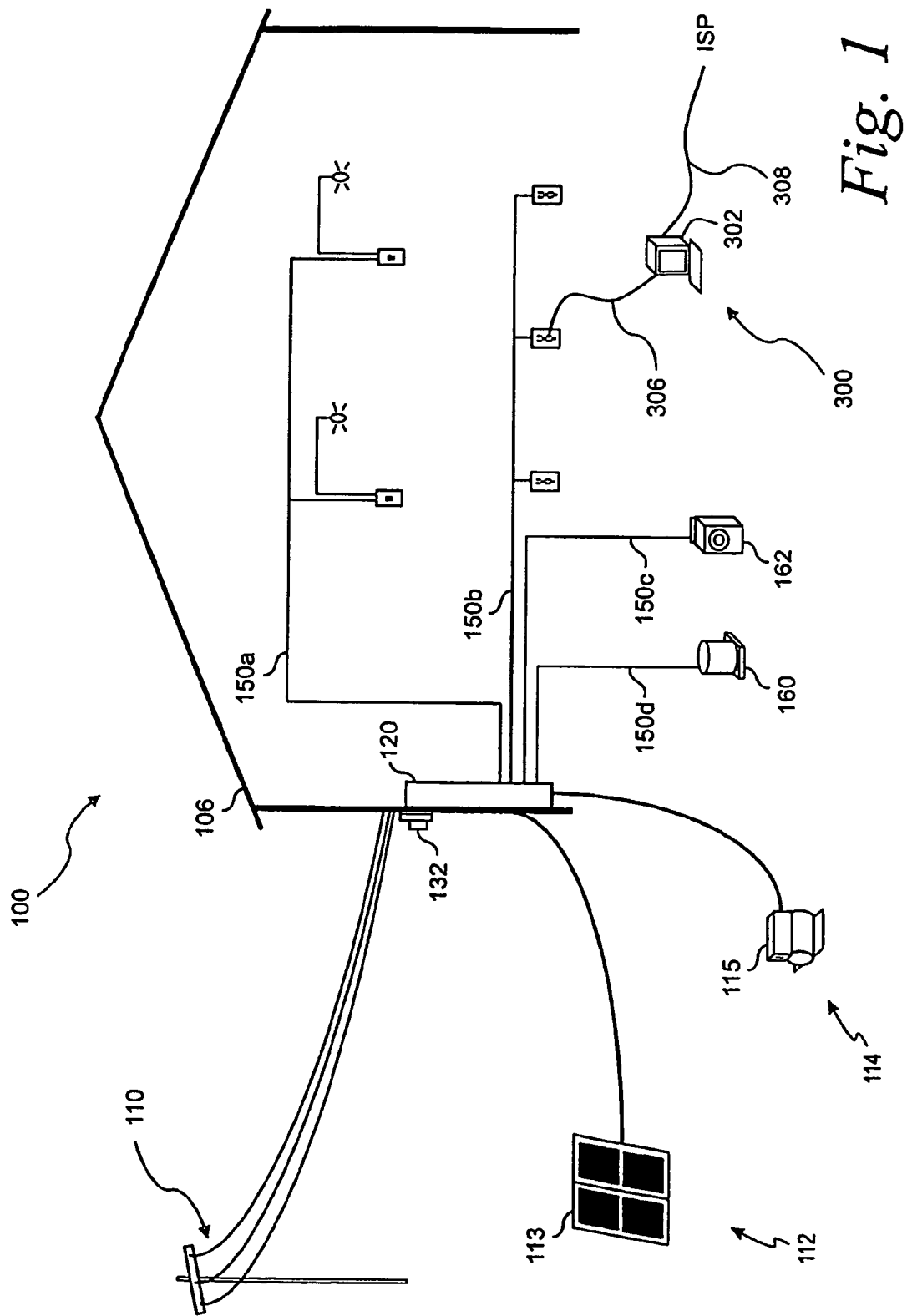
FIG. 1 is a functional block representation of an exemplary residential power distribution system.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Referring now to the drawings, and initially to FIG. 1, a schematic representation of a residential power distribution system 100 is shown. A residence 106 is supplied power from an electrical power utility 109, referred to herein as the power grid or power utility source 110 through a utility power meter 132. Alternate energy sources 112 can also be present in the residential environment, such as solar panels 113, fuel cells (not shown), wind vanes (not shown) or other methods of producing electrical energy. Standby or backup power sources 114 can also be present such as generators 115, storage batteries, or an uninterruptible power supply, such as a UPS. Although a residential power distribution system 100 is shown in FIG. 1, it is understood that the present invention also applies to other types of power distribution systems, such as industrial or non-residential power distribution systems.

According to an embodiment of the present invention, the power sources 110, 112, and 114 are connected to a power distribution control panel 120. The power distribution control panel 120 distributes electrical energy to various residential circuits 150a-d. Each circuit is connected to the power sources 110, 112, and 114 through a protective device in the power distribution control panel 120 such as an overload circuit breaker, not shown here, but discussed in greater detail below. In various embodiments, some or all circuit breakers to be managed by the present scheme are coupled to or include a branch circuit meter to provide data on the individual branch currents. Branch current monitors (BCMs) commercially available from Veris Industries are suitable (though not exclusively so) for this purpose.

The electrical circuits found within a residence or facility 106 are generally installed in a per-room and/or per-floor basis. For example, as shown here for simplicity, the circuit 150b has wall outlets for a specific group of rooms and the circuit 150a supplies electrical power to lighting systems for a specific group of rooms. In practice, lighting and electrical power outlets often share a circuit and the associated protective circuit breaker device.

Other electrical circuits that tend to be dedicated include environmental equipment such as air conditioning 160, clothing washers and dryers 162, heating, and audio-visual power circuits. Specialized outdoor circuits for swimming pool, yard lighting, and sprinkler systems can also be present in residential environments.

According to an embodiment of the present invention, the residential power distribution system 100 includes a power management system 300 that has a web server 302 connected to an internet service provider (ISP) by means of a conventional Internet connection 308, e.g., cable modem, digital subscriber loop (DSL), etc. The web server 302 is connected by a power cable 306 or other network cable to a residential electrical power outlet from which it draws electrical energy. The web server 302 conventionally includes a controller.

A role of the web server 302 is to communicate messages throughout the residential power distribution system 100. To do so, the web server 302 sends and receives power line communication (PLC) messages via a conventionally known PLC modem. Any PLC-controllable or PLC-messaging devices connected to the residential power distribution system 100 can communicate with the web server 302, and can be controlled or monitored by PLC messaging via the web server 302.

As mentioned above, the residential power distribution system 100 can include alternate energy sources 112 or backup power sources 114, which can supply power to the residence 106 if power from the power utility source 110 is unavailable or diminished. However, these types of power sources have reduced power capacity as compared with the nearly infinite power capacity from the power utility source 110, and therefore these alternate or backup sources need to be used sparingly in order to prolong their ability to supply power to the loads connected to them and to prevent overloading the source. In the current state of the art, when backup or standby power sources are used, they supply electrical power via dedicated circuits within the residence or facility 106 to sensitive equipment such as medical equipment. To provide these dedicated circuits requires rewiring or special wiring and leaves the remainder of the residence or facility without power during a loss of utility power. By employing the intelligent power distribution system of the present invention, electrical power can be made available to the entire house or facility 106 without rewiring, and distributed electrical devices connected to the electrical circuits can be controlled on a load basis through the power distribution control panel 120.

Figure 2:
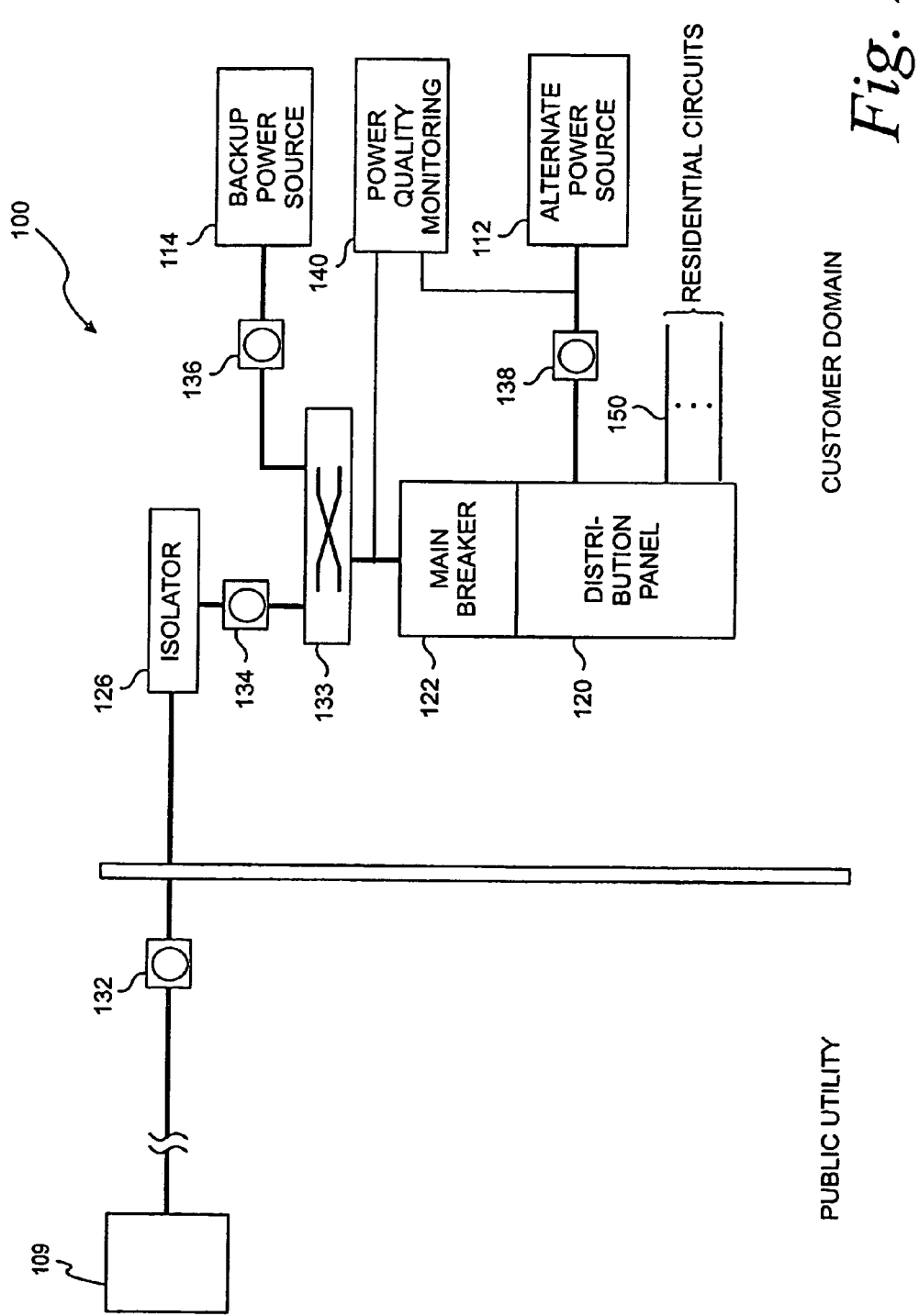
FIG. 2 is a functional block diagram of a residential power panel showing energy sources and load feeds according to an embodiment of the present invention.

Turning now to FIG. 2, a block diagram of the residential power distribution center 100 from FIG. 1 is shown according to an embodiment of the present invention. Electrical power from a power utility grid 110 is connected to a utility power meter 132, which is typically mounted on the exterior of a residence or facility 106 and is accessible to utility company personnel. Meters suitable for the utility power meter 132 are typically called revenue meters and are installed by the utility company. Meters suitable for user meters 134, 136 and 138 include PM-850 PowerLogic® meters. An isolator 126 can serve one or both of the following purposes: first, it prevents PLC messages used within the residence or facility 106 from being broadcast externally; and second, it prevents PLC messages present on the utility power line from entering the residence or facility 106. In other embodiments, the isolator 126 is not supplied in order to permit communication between the utility and the residence 106.

According to some embodiments, a user meter 134 is accessible to the user and allows the user to track and monitor the amount of electrical current and/or power used from the power utility source 110 on a real-time basis. The amount of electrical current and/or power from the backup power source 114 is monitored by a backup power monitor 136. Power from the power utility source 110 and the backup power source 114 are coupled to a transfer switch 133. The transfer switch 133 provides the user a way to control the source of residential power, and is present only when multiple power sources are available. Power from the transfer switch 133 is routed to the power distribution control panel 120 through the main breaker 122.

According to another embodiment of the present invention, an alternate power source 112, such as the solar panel array 113 or a wind vane, is also present. The alternate power source 112 supplies power to the distribution control panel 120 through another user-accessible power meter 138, which allows the user to control the output power level of the alternate power source 112. A separate, alternate power meter monitors the amount of electrical current and/or power delivered by the alternate power source 112.

According to yet another embodiment of the present invention, a power quality monitor 140 monitors the quality of the energy received from the power utility source 110 or backup power source 114 and/or an alternate power source 112. Power quality information is obtained from the power quality monitor 140 (or monitors) via PLC messaging or meters 132, 134 and 138 via conventional serial communications by the power management system 300 described below.

User access and control to the various devices mentioned, e.g., the transfer switch 133, the backup power source 114 and/or the alternate power source 112, the power meters 134, 136 and 138 as well as the power quality monitor 140 is accomplished, according to an embodiment of the present invention, by means of power line communication messaging. In other embodiments, user access and control can be carried out using other suitable communications messaging schemes, such as via Ethernet, RS-485, RS-232, Universal Serial Bus (USB), or wireless schemes.

Figure 3:
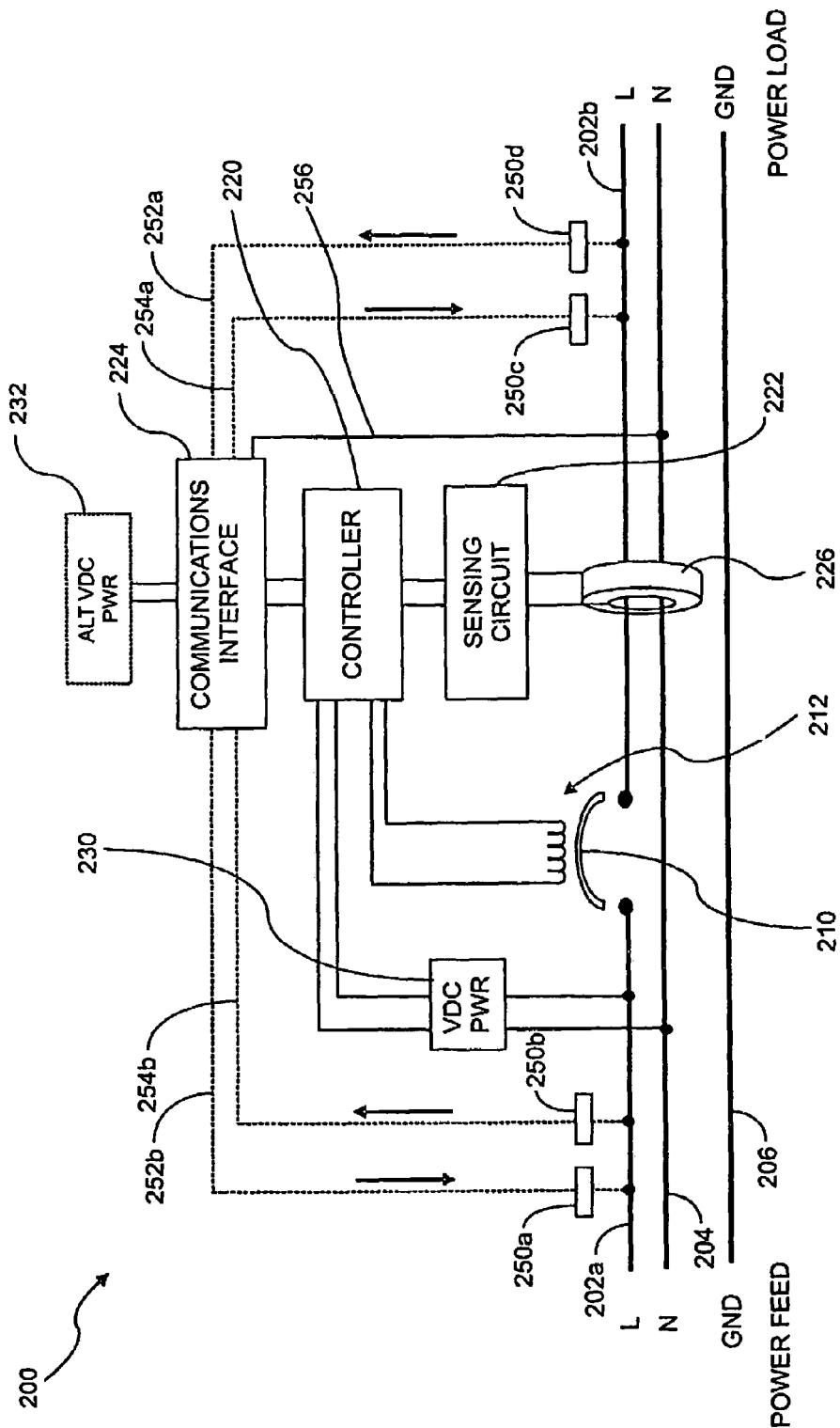
FIG. 3 is a functional representation of an intelligent circuit breaker device according to an embodiment of the present invention.

Turning now to FIG. 3, a functional representation of an intelligent circuit breaker 200, according to an embodiment of the present invention, is shown. The circuit breaker 200 is operatively connected to a line conductor 202 and a neutral conductor 204. The line conductor 202 has a line side 202a and a load side 202b. A separate ground conductor 206 is also shown. A single pole breaker 200 is shown here as an illustrative example having contacts 210 on the line conductor 202. In other embodiments, a double pole breaker having breaker contacts for each phase load line can be utilized for two-phase loads, such as clothes dryers 162, HVAC units 160, pool pumps, and the like.

Part of the circuit breaker 200 operates similarly to conventional circuit breakers. A conventional mechanical mechanism (not shown) is used to set or engage the breaker contacts 210, which allow current to flow through the load conductor 202. If the circuit breaker 200 trips, i.e., opens the breaker contacts 210, because of a detected overload or fault condition, the breaker contacts 210 can only be reclosed manually by means of the aforementioned mechanical mechanism and cannot be reclosed remotely.

Current and/or fault sensing device(s) 226 are operatively coupled to the line and/or neutral conductors 202 and 204 depending on the type of current and/or fault sensing circuit used. The sensing device(s) 226 and sensing circuit 222 are exemplary only, and the configuration and deployment of these components is well known to those of ordinary skill in the art. The sensing circuit 222 is connected to the sensing device(s) 226 and to a controller 220. According to an embodiment of the present invention, the controller 220 is a micro-controller. According to another embodiment of the present invention, the controller 220 is a special-purpose integrated circuit. According to yet another embodiment of the present invention, the current sensing circuit 222, shown here to be a separate function, can be integrated into the controller 220.

A communications interface 224 is coupled to the controller 220 and optionally coupled to an optional 24 VDC source 232. The communications interface 224 can, in alternate embodiments, enable communications via PLC messaging, Ethernet, RS-485, or wireless communications schemes. The communications interface 224 can be a PLC module capable of handling PLC messaging schemes. The following discussion assumes that the communications interface 224 is a PLC module, however, it should be understood that the present invention is not limited to such communication scheme. One of the problems with PLC messaging is that when current state-of-the-art circuit breakers are in the open position the communication link is broken. To overcome this problem, the PLC module (communications interface 224) spans the gap to provide a communication path between the line side of the circuit and the load side by means of power line couplers 250a-d. The power line couplers 250a-d are positioned to span the circuit breaker contacts 210 and to provide a communication path even when the circuit breaker contacts 210 are in the open or tripped position.

Signals from a messaging source on the load side 202b are sent across power line coupler 250d through the communication line 252a to the communications interface 224. The communications interface 224 passes the message signal out the communication line 252b through the coupler 250a to the line side 202a. Couplers 250b and 250d and communication lines 254a and 254b are used for signals passing in the other direction—i.e., from the line side 202a to the load side 202b. According to another embodiment of the present invention, the communications interface 224 is also a repeater, used to boost the signal strength of the communication link between the line side and the load side of the circuit. According to yet another embodiment of the present invention, the communications interface 224 is also connected to the controller 220 and thus acts as a local modem. This connection allows for remotely communicating with and controlling the controller 220 and thereby the circuit breaker contacts 210, as well as accessing the state of the circuit breaker 200 by means of PLC messaging. A message detected at the load and line side of the contacts would indicated that the contacts are in closed or in contact with one another. Signal strength of the two signals could also be compared on line and load side to access the open or closed state.

According to an embodiment of the present invention, an AC-to-DC power supply 230 that is integrated with the circuit breaker 200 provides DC power to the controller 220, the sensing circuit 222, and the communications interface 224. The power supply 230 draws electrical energy off of the power lines 202a, 204 coupled to the circuit breaker contact 210. According to an alternative embodiment of the present invention, DC power is obtained from an optional 24 VDC power source 232 to supply power to the circuit-breaker devices in the intelligent circuit breaker 200 as well as providing power for communication to other components of the power distribution control panel 120 and uses an uninterruptible power source to back-up the power to the optional 24 VDC power source 232.

Variations in the controller 220, the current sensing circuit 222, and the sensing device(s) 226 can produce circuit breaker devices with different operating characteristics or combination of operating characteristics. These variations can affect the conditions under which a fault or overload is detected by the following devices within the circuit breaker: current overload device, ground-fault circuit interrupter, or arc-fault circuit detector.

When a fault or overload condition is detected, the controller 220 energizes a conventionally known trip mechanism 212 such as a solenoid or other mechanism, which physically opens the circuit breaker contacts 210. Using the intelligent circuit breaker 200, the operational current and fault threshold levels can be altered on a real-time basis depending on circuit requirements or environmental conditions. The alterations can include any of the following and be carried out automatically or under user control:

1. Adjusting the GFI trigger levels. The intelligent circuit breaker 200 can change the trip point, for example, from 5 mA to 30 mA depending on the application.
2. Calibrating any sensing element, such as sensing device(s) 226 to account for variations in the loads.
3. Dynamically lowering or raising the trip threshold levels of the intelligent circuit breaker 200 to account for variances in the construction of various loads, for example. A load on a dedicated circuit, such as a refrigerator, can be monitored over time, and a new threshold can be established once a sufficient amount of load data has been accumulated. The threshold levels can also be set during the manufacturing process or during final installation to account for variability of component material.

According to an embodiment of the present invention, the controller 220 controls aspects of the power line communication. A PLC module (communications interface 224) is connected to both the line side of the power conductor 202*a* and the load side of the power conductors 202*b*. This allows power line communication to occur across open circuit breaker contacts 210, thereby permitting access to PLC-capable devices connected to the load side of the power conductors. It also allows PLC messages to be communicated to and from the line side 202*a* of the contacts 210 in such a configuration, an additional connection 256 from the communications interface 224 to the neutral conductor 204 is required. The communications interface 224, communication lines 252*b* and 254*b* and utility power source line 202*a* via power line couplers 250*a* and 250*b* and neutral connection 256 provide a closed communications loop on the line side of the circuit breaker contacts 220 and communications interface 224, communication lines 252*a* and 254*a* connected to the load line 202*b* via power line couplers 250*c* and 250*d*, neutral connection 256, and the load provide a closed loop on the load side of the circuit breaker contacts 220. According to other embodiments of the present invention, the communications interface 224 is incorporated into the controller 220 or special purpose integrated circuit.

The intelligent circuit breaker 200 can be powered by a 24 volt DC source (shown generically as the AC-to-DC power supply 230 in FIG. 3) connected to the line side of the circuit and draws its power from the un-switched line conductors 202*a* and 204 so that the intelligent circuit breaker 200 remains powered even when the circuit breaker contacts 210 are open. The AC-to-DC power supply 230 can be housed within the circuit breaker 200. According to another embodiment of the present invention, the AC-to-DC power supply 230 contained within the circuit breaker 200 also has an uninterruptible power source, such as a battery or U.P.S., to provide communication power during a power interruption. According to another embodiment of the present invention, the optional 24 VDC power source 232 exists to power the components of the power distribution control panel 120. This 24 VDC power source 232 also provides an uninterruptible power source to ensure PLC communications. The 24 VDC power source 232 supports power line communications even when the utility power is not in service and no alternative or backup power 112, 114 sources is available.

Because the breaker contacts 210 are under control of the controller 220, they can be opened or closed remotely (such as by a conventionally known motorized mechanism) and without manual intervention even when no overload or fault condition exists. An example of such a circuit breaker is found within the G3 PowerLink™ motorized circuit breaker panel and also found in the QOPL PowerLink™ Circuit Breaker, although any other suitable remote operable circuit breaker can be used. The breaker contacts 210 are opened or closed in this manner by messages, such as PLC messages or messages in Ethernet packets, from a central load management system 300, such as the one described below in connection with FIG. 4.

Figure 4:
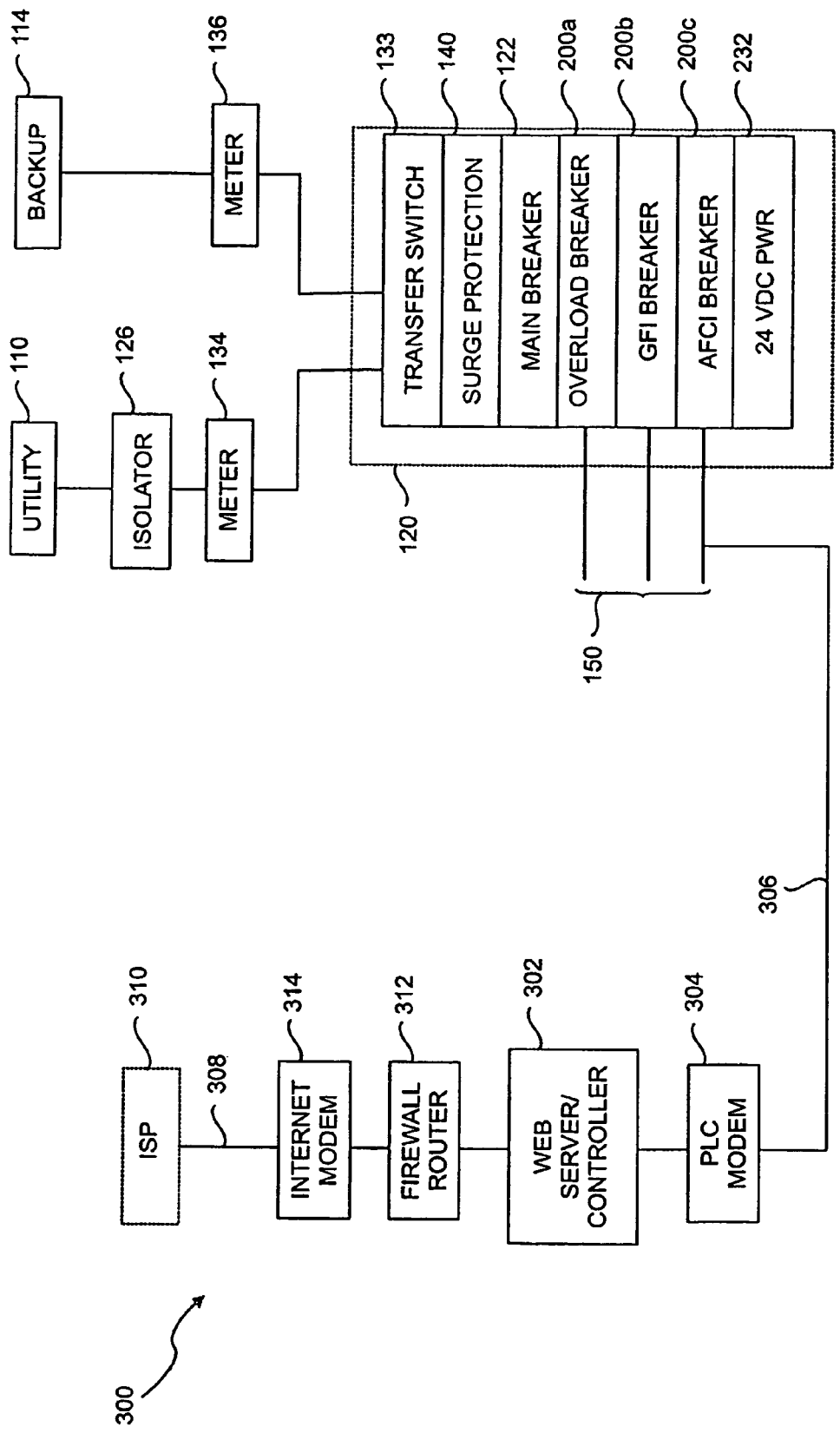
FIG. 4 is a functional block diagram of a residential load management system and its components according to an embodiment of the present invention.

In some embodiments of the present invention, the status of the intelligent circuit breaker 200 can be queried by the load management system 300 or similar residential control unit. The expected statuses of the intelligent circuit breaker 200 include, but are not limited to:

1. Engaged, closed
2. Disengaged, open, i.e., manually open, not controllable
3. Tripped, cause of trip (overload, fault, etc.)
4. Open, i.e., commanded open and recloseable FIG. 4 illustrates a functional block diagram of a load management system 300 that depicts components of the power distribution control panel 120. A power feed from the power utility source 110 provides electrical energy to the power distribution control panel 120. The isolator 126, on the utility power feed line, prevents PLC or other communication signals from external line-side sources from being broadcast internally and also prevents internal load-side PLC or other communication signals from being broadcast externally. The isolator 126 is particularly useful in multi-dwelling units, preventing one unit from accessing or controlling power levels to another unit. In embodiments where such communication is desired, the isolator 126 is omitted. The backup power source 114 supplies power to the distribution control panel 120 when power from the power utility source 110 is unavailable or diminished. User-accessible meters 134 and 136 monitor the usage of electrical energy of the utility power source 110 and the backup power source 114, respectively.

Generally, the power distribution control panel 120 can, in alternate embodiments, include any combination of a controllable transfer switch 133, a surge protector 140, a main breaker 122, an overload breaker 200*a*, a GFI breaker 200*b*, an AFCI breaker 200*c*, and a 24 VDC power supply 232. The breakers 200*a-c* are connected to electrical circuits 150, some or all of which can be protected by the surge protector 140 in various embodiments.

The transfer switch 133 selects the source of electrical power, such as utility or standby/backup power. In the event of a utility power failure, the transfer switch 133 can switch the source of electrical power from the power utility source 110 to the backup power source 114. In a specific embodiment, the surge protector 140 protects the entire residence or facility 100.

The circuit breakers 200*a-c* are not meant to represent an exhaustive list. The circuit breakers have a mechanical, manual set and reset mechanism, and an optional override switch. According to an embodiment of the present invention, the functional state of the circuit breaker is detectable. A partial list of such functional circuit-breaker state information includes:

1. Manual off
2. Engaged

3. Tripped

4. Remote off.

The 24 VDC power supply 232 supplies power to various components in the power distribution control panel 120 and enables PLC message communication and remote operation of the circuit breakers 200a-c. Although the 24 VDC power supply 232 is shown as a separate block in FIG. 4 as supplying power to all of the components in the distribution control panel 120, it can in other embodiments be incorporated into individual components within the control panel 120, such as in any one or more of the circuit breakers 200a-c.

The dynamic load management system 300 further includes an internet modem 314 coupled to an Internet Service Provider (ISP) 310, a firewall router 312, a web server 302, and a PLC modem 304. In an embodiment, the web server 302 obtains power from a wall outlet by means of a power cord 306 and is capable of sending power line control (PLC) messages by means of the PLC modem 304 through the power cord 306 to an electrical circuit 150. Alternatively, in other embodiments, the web server 302 obtains its power from the 24 VDC power supply 232 optionally housed within the circuit breaker 200 or in the distribution control panel 120. Software running on the web server 302 is responsive to user configuration and command information to display a variety of electrical status information, to control alternate power sources, and to limit power usage, such as by carrying out an adaptive load management algorithm 600 described in connection with FIGS. 6 and 7 below. The power utility company 109 can thus access the distribution control panel 120 over the Internet via the user's ISP, allowing the power company to take advantage of the existing infrastructure and technology without having to reconfigure the power grid for use as a communications network, although such reconfiguration is within the scope of the present invention.

As noted above, although the present discussion refers to PLC messaging, the present invention is not limited to PLC messaging but rather contemplates other communication schemes such as Ethernet, RS-485, or wireless communication schemes, to name a few. For example, in an embodiment employing an Ethernet communication scheme, the PLC modem 304 can be replaced by a conventional Ethernet controller. Similarly, for a wireless communication scheme, the PLC modem 304 can be replaced by an 802.11 wireless controller.

The Internet modem 314 can be any conventional Internet modem, such as a cable modem, digital subscriber loop (DSL) modem, or a wireless modem, to name a few. The ISP allows commands and information to be communicated externally from the residence or facility 100. For example, the user can access, monitor, and control from a remote location via the ISP 310 the loads connected to the electrical circuits 150 by logging into or otherwise gaining access to the web server 302. In some embodiments, the web server 302 receives commands from the power utility 110 or passes messages to the power utility 109. The power utility 109 has access to the web server 302 through internet access across the user's firewall 312. In these embodiments, for example during peak power demand periods or during emergencies, the power utility 109 can disable certain electrical loads or initiate rolling blackouts to selected loads connected to the power grid. By way of example only, during a peak power demand, the power utility 109 can disable or cycle air conditioning units or swimming pool motors in selected facilities connected to the power grid 110 on a rolling basis by sending appropriate messages via the Internet to each facility's web server 302, which in turn communicates a message to the appropriate breaker in the distribution control panel 120 to remotely disengage the contacts across the breaker to which the air conditioning unit is connected thereby preventing that unit from receiving power.

To address "Big Brother" concerns, the user can allow or disallow the utility company access to certain loads. For example, to avoid the furnace motor from being cycled or turned off during peak periods of electrical usage, the user can disallow remote access to that load. Of course, the user can grant himself such access, in case he leaves for an extended vacation and forgets to turn the furnace off, for example, in order to save electricity.

Utility companies can provide incentives for power reduction in the form of rebates or other utility rate guarantees. For example, users who sign up for a power reduction program and agrees to grant the power utility company 109 remote access to the distribution control panel 120 can receive rebates or a reduction in the rate available to users who do not take advantage of the program. Regardless of whether the power utility companies 109 have access to the distribution control panel 120, the present invention allows the user great flexibility in remotely controlling and monitoring the loads connected to the control panel 120.

For example, the user can use dynamic load management to limit the electrical power consumption by self-imposed limitations based on occupancy, power consumption, power efficiency, cost-of-power considerations, time-of-day or time-of-year pricing and/or real-time pricing. When an alternate power source 112 is present, it can be selected to supply part of the residential load. According to another embodiment of the present invention, when an alternate power source 112 is present power can be supplied backwards onto the utility grid 110. The user meter 134, provides the user with information on the amount of power fed onto the power grid 110. The power meters 132 and 134 are also accessible to the power utility 109 so that rebates, etc. can be applied to the customer's account when excess electricity is so obtained.

The Internet-connected web server 302 can communicate with weather forecasting services to protect against lightning damage and other weather-related occurrences. Designated circuits, such as those supplying electrical power to sensitive equipment, can be shut down, unless overridden, to offer a further degree of protection even when surge protection is used. This is especially useful when the occupants are away from the residence or facility 100.

According to an embodiment of the present invention, when there is a loss of power from the power utility source 110, alternate power sources 112 or backup power sources 114 are switched into the residence 100. When a standby or backup power source 114, such as a power generator 115 is used, commands can be sent over the PLC link to start the power generator 115. An uninterruptible power source (not shown), which usually is a battery or set of batteries, maintains the devices that use the PLC link.

During utility power source 110 failures the backup power source 114 is usually unable to supply all of the needs of the residence. Therefore, a new set of user-configurable guidelines are used to configure the dynamic load management system 300 based on the capacity of the backup power source 114 or the alternate power source 112 or a combination of local energy sources. Therefore, according to an embodiment of the present invention, designated circuits have a priority over non-designated circuits for power, however, electrical power is still available to the entire residence. Conventional systems utilizing backup power generally run dedicated circuits to supply power to selected systems requiring rewiring and a loss of power elsewhere in the residence.

According to another embodiment of the present invention, when there is a failure of the power grid such as a dangerous undervoltage condition, there is an opportunity to protect equipment using induction motors from brownout conditions by turning off the designated circuits supplying such equipment. When the brownout condition ceases, power can be restored by the dynamic load management system 300. During excessive overvoltage conditions, the loads can be similarly shut off to protect the power distribution system of the residence or facility 100.

Figure 5:
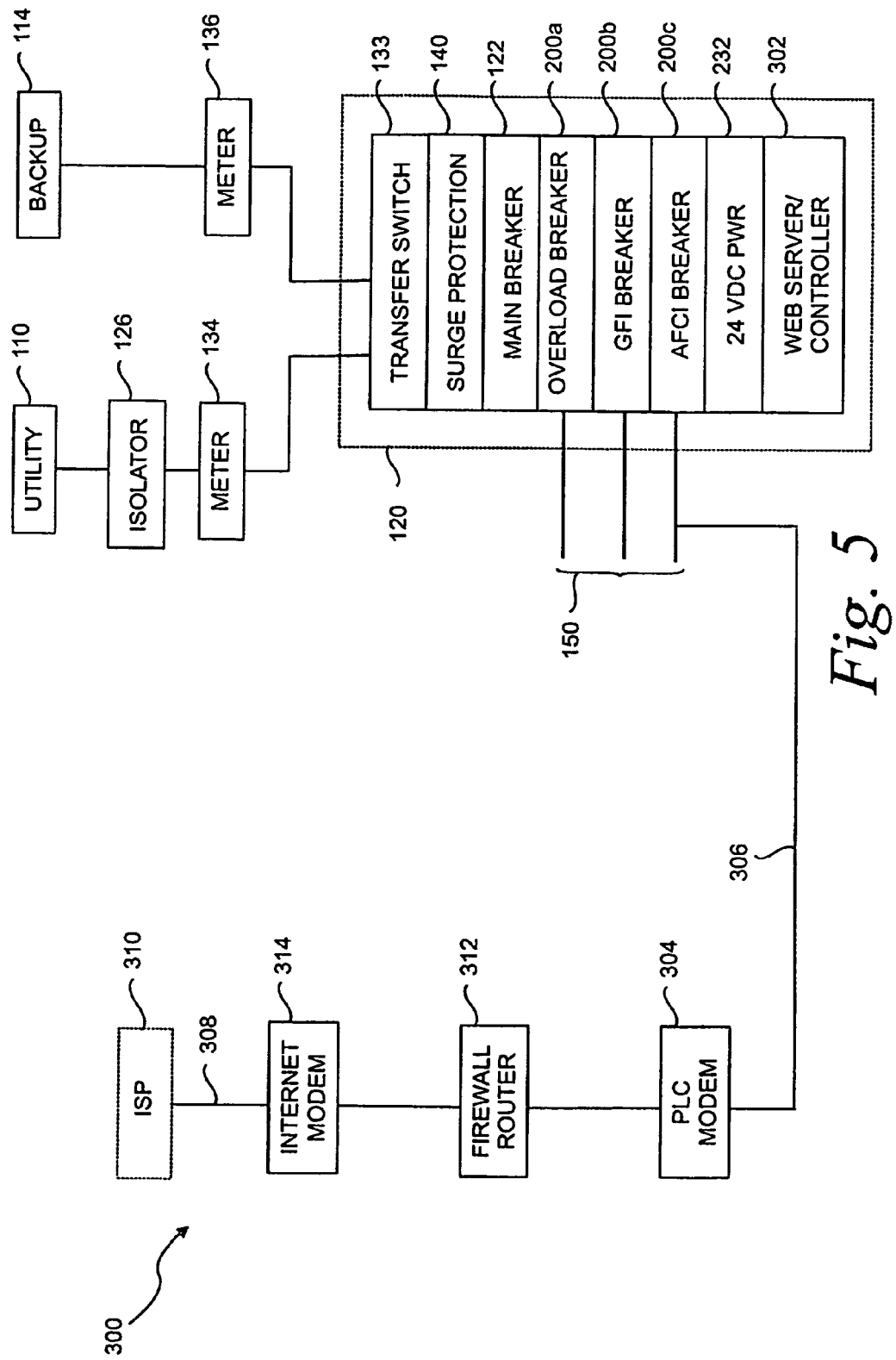
FIG. 5 is a functional block diagram of a residential load management system and its components according to another embodiment of the present invention.

In FIG. 5, the configuration is the same as shown in FIG. 4 except that the web server 302 is incorporated into the distribution control panel 120 in FIG. 5. The web server 302 in the configuration shown in FIG. 5 can be powered by the AC-to-DC power supply 230 or the 24 VDC power supply 232 optionally housed within the distribution control panel 120.

Figure 6:
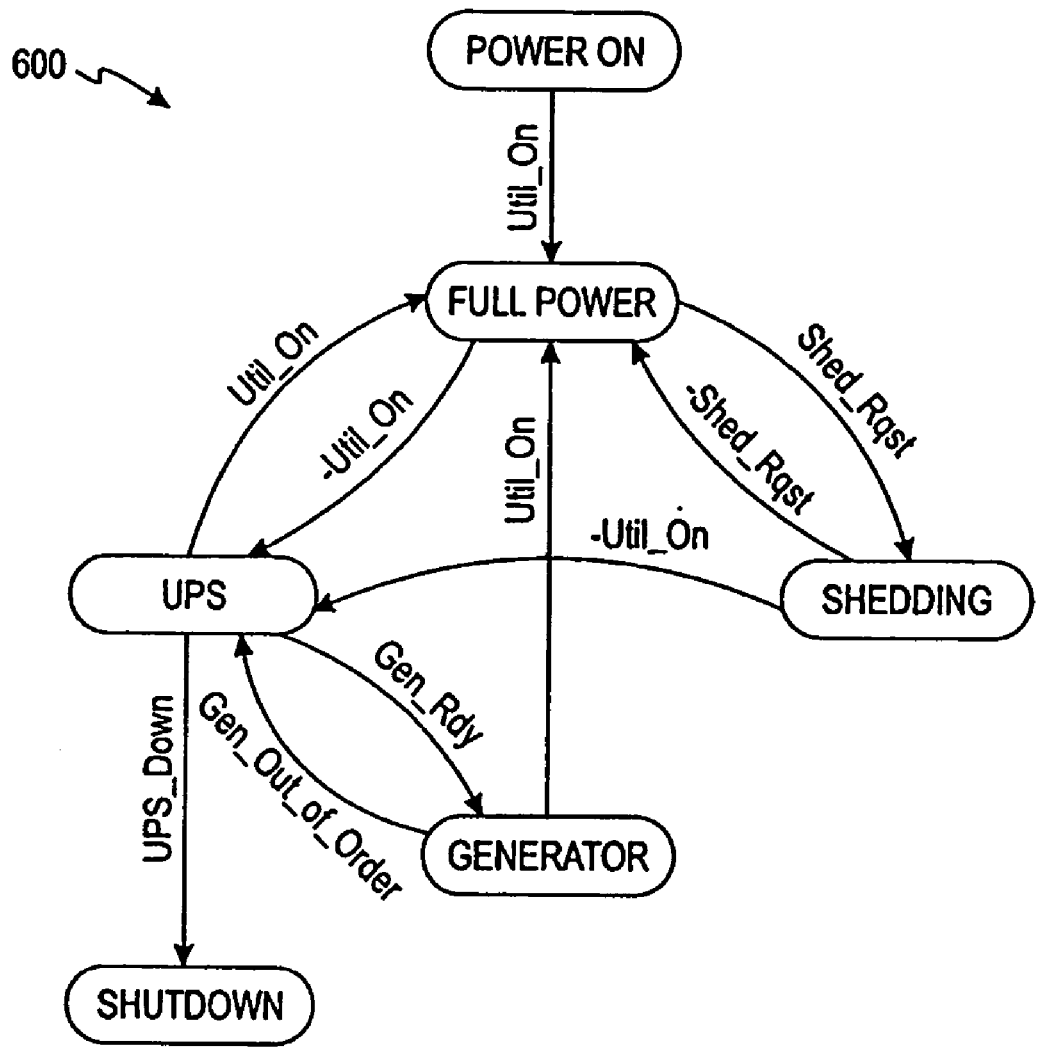
FIG. 6 is a state machine diagram of an adaptive load management algorithm according to an embodiment of the present invention.

To reduce peak power consumption and to accommodate an existing set of loads to changed power supply conditions, the present invention uses an adaptive load management algorithm 600 shown in state machine form in FIG. 6. The changed power supply conditions can include: switching to the alternate power source 112 or to the backup power source 114, a request from power utility 109 to "shed" a load, etc. The adaptive load management algorithm 600 of the present invention preserves as much as possible the functionality of the system. For example, household loads could be rearranged to comply with changing power supply requirements and still perform their functions if the available power supply is only slightly lower than the demand. If the power demand increases, the most important loads can stay online while the least important could be disconnected. The decision to switch the load on or off is made on the basis of the importance (priority) of the load, and/or historical data regarding the load behavior gathered beforehand by the dynamic load management system 300.

The adaptive load management algorithm 600 of the present invention learns the behavior of the loads as well as the load properties available for some loads in order to make the best guess regarding the best load-control strategy. The algorithm is preferably applied to residential installations, but could be also used in any other installations. The same adaptive load management algorithm 600 can be applied regardless of the power source, whether it be the utility power source 110, the alternate power source 112, or the backup power source 114.

Conditions of a limited power could arise during emergency situations such as bad weather conditions resulting in power outages, utility equipment failure, or higher electricity cost hours. Usually a simple disconnection of "not important" loads is used to comply with the restrictions. For example, an existing practice is to shut down an HVAC unit when a power utility 109 requires "shedding" the load during peak hours. Or, in the case of backup power source 114, a customer should chose a fixed, non-configurable set of loads to be turned on, while all other loads have to be shut down. Such selection normally has to be done during construction, when the distribution control panel 120 is installed. This inflexibility disadvantageously does not allow post-installation dynamic reconfiguration of the loads.

Power usage by a load is not constant. Some loads are cycling, like a refrigerator or hot water heater. Some loads (kitchen range or lights) could be switched on or off manually. Other loads have a significant in-rush current (air conditioning units, for example), which could be prevented from starting when the power source is unable to provide an overload current even for couple seconds. An optimal managing of the loads in such conditions is critical to keep as many loads functioning as possible.

To manage loads in the most flexible way, the decision-making process can be improved by learning more about the load-specific properties. For example, a refrigerator could present a health hazard if disconnected for a long time, so special attention is required for shedding it. The user also can apply a beforehand knowledge and learned data to dynamically change a set of loads that should be put on or off in each particular period of time. For instance, a dishwasher scheduled for running at 11:00 p.m. could be easily rescheduled to 3:00 a.m., if necessary, but it should not be shut down if it is already running. The same is true for cooking. Shutting down the range in the midst of food preparation to yield half-cooked food would ruin the meal.

Therefore, knowledge of the load properties, as well as its previous state, should be used to select the best order and time for running each load. The previous state is the state of the load before it was shut down and could be determined by monitoring the consumed power for a previous predetermined length of time. For instance, the kitchen range would cycle on and off to keep burner surface in a required temperature range. Thus, a zero immediate consumed power does not necessary mean that the burner is off. It could mean that the burner load is in an OFF part of the ON/OFF cycle, and therefore could return to ON state at any time.

The types of loads are categorized according to any of the following:

1. Having significant in-rush current (HVAC, arrays of incandescent lights, etc.)
2. Interruptible or not interruptible: for example, a hot water heater could be disconnected for a short period of time without much inconvenience (interruptible), but it can be desirable to have a TV set on all the time as long as it is being watched (not interruptible).
3. Cycling or not cycling load: a cycling load could share the available power in different time slots, reducing the peak power.
4. Acceptable for long (e.g., hours) interruptions or not. For example, a hot water heater could be disconnected for hours during the daytime when hot water consumption is low (acceptable), but a refrigerator must keep food cold and cannot be disconnected for long periods of time (not acceptable).

Power sources are categorized by any of the following:

1. Ability to tolerate an overload: High (such as the utility power source 110), Low (such as the backup power source 114), and Zero (such as the alternate power source 112). This category is important for starting the "high in-rush current" loads like a HVAC compressor.
2. Ability of the different power sources 110, 112, and 114 to work synchronously: a typical solar cell inverter (alternate power source 112) can, while a low-cost emergency generator 115 (backup power source 114) normally cannot.

The adaptive load management algorithm 600 of the present invention carries out several goals. First, it works with a distribution system, such as the dynamic load management system of the present invention, which includes:

1. Load center (panel board) such as the distribution control panel 120 equipped with either conventional (manual) and controllable (motorized) or controllable only (and no conventional) circuit breakers 200. One such suitable distribution control panel 120 is the G3 PowerLink™ motorized circuit breaker panel.
2. Branch circuit meters such as the sensing circuits 222 provide data on individual branch currents. Exemplary branch current monitors for this purpose are commercially available from Veris Industries.

3. A controller adapted to communicate with a network, such as the web server 302. An example of such a server is a PowerServer™ running Tridium-Niagara™.

4. A network for communicating between the controllers, meters, panels, some loads, and user interface, such as the communications interface 224 and related interconnected devices shown in FIGS. 3-4.

Second, the adaptive load management algorithm 600 of the present invention provides a way to use a smaller size alternate power source 112 for emergency or reduced energy consumption for the house or facility 106.

Third, the adaptive load management algorithm 600 of the present invention reduces (or "shaves") the power consumed by the loads during peak periods. It does so by sequencing the interruptible loads, briefly shutting down the interruptible loads to provide extra power for starting "high in-rush current" loads, or postponing the running of "low priority" loads. For example, a dishwasher could be rescheduled to run at nighttime, when the consumption is minimal.

Fourth, the adaptive load management algorithm 600 of the present invention reduces energy consumed during the "high energy cost" hours, as described above.

Fifth, the adaptive load management algorithm 600 of the present invention provides a smart adaptive management of loads when in restricted power mode (such as when power is supplied by a backup power source 114, etc.) by at least any of the following:

1. Monitoring each load (branch) to collect (learn) data on recent power consumption of the load to be able to predict possible consumption if the load is online.

2. If the utility power source 110 has been shut down (because of an emergency or other reason), the adaptive load management algorithm 600 turns all loads off and, after the backup power source is on, turns a pre-calculated set of loads back on. The pre-calculated set of loads is determined based on predicted power consumption (calculated from historical data), the dynamic priority of each particular load, and available power.

3. Dynamically changes the list of loads with time according to measured present power consumption, dynamic priority of each particular load, and availability of power from the backup power source 114.

4. Maintains the dynamic list of active loads according to a dynamic priority list, present state of the loads, and the power available from the backup power source 114.

5. Maintains the dynamic list of priorities for each load.

6. Manages switching of the loads ON or OFF by controlling the load branches in the distribution control panel 120 using controllable circuit breakers 200, or by communicating directly with loads and instructing them to change the ON/OFF state if the loads are capable for such a communication.

The adaptive load management algorithm 600 maintains a state machine that switches the system into one of predefined states. FIG. 6 shows a state machine diagram of an embodiment of a state transition algorithm. Four states are illustrated: Full Power, Shedding, Generator, and UPS. Each of these states will be described next in further detail.

1. Full Power state: the main power source (such as the power utility 110) is running at full power and does not request any restrictions. All loads are online. A "smart" algorithm can in some embodiments be applied to make the cycling loads share the same power using sequential time slots if possible to reduce peak power.

2. Shedding state: the main power source requests reducing consumed power. Some less important loads are temporarily set offline to reduce power.

3. Generator state: the utility power source 110 is out of service, so the system is powered from the alternative power source 112 (generator 115, fuel cell, etc.). The adaptive load management algorithm 600 works to optimize the set of loads able to work with the limited power supply (discussed in further detail in connection with FIG. 7). A dynamic list of priorities is maintained for the loads reflecting a possible state change of the loads.

4. UPS state: the system is running on the backup power source 114. Only the most critical loads are online. In this state, the system waits until the backup power source 114 is online. If the backup power source 114 fails to come online, the system has to be shutdown.

Figure 7:
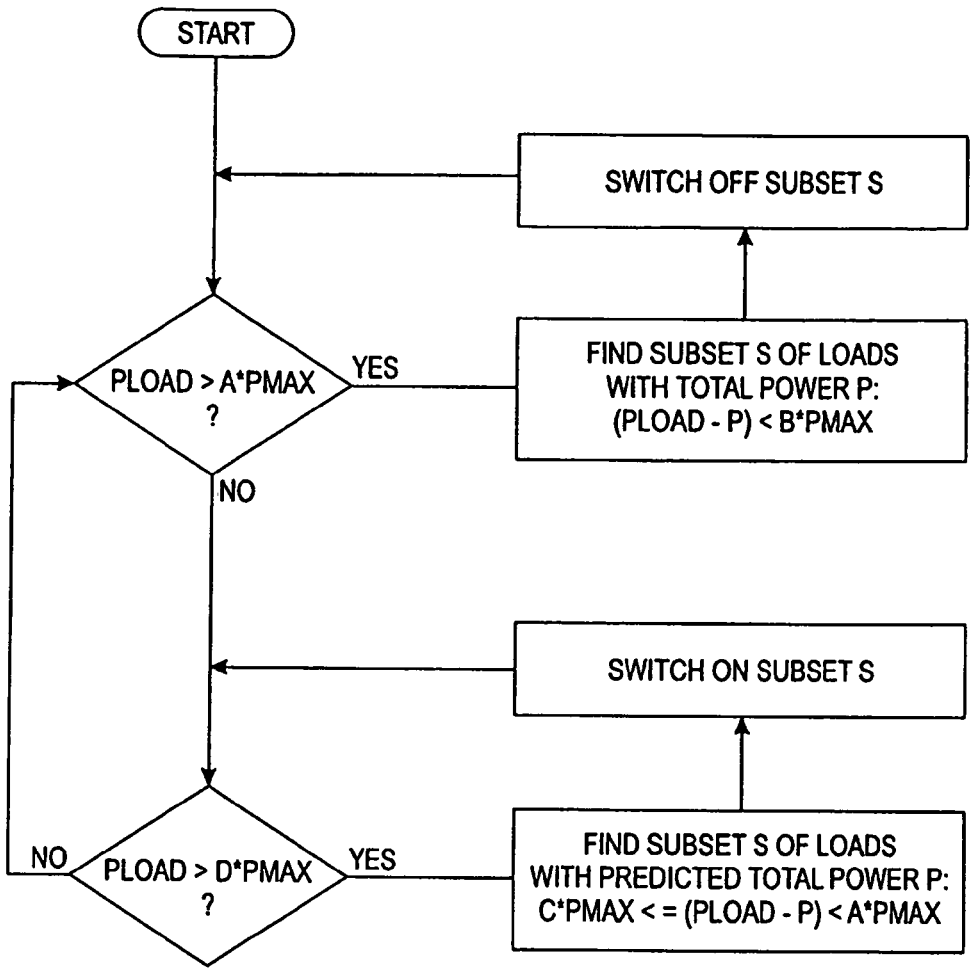
FIG. 7 is a flow chart diagram of an adaptive load management algorithm for managing loads in a limited power source environment according to an embodiment of the present invention.

Turning now to FIG. 7, the adaptive load management algorithm 600 for managing loads in a limited power source environment maintains a maximum possible number of loads online while keeping the total consumed power under the power source limit, Pmax. If the total load (Pload) is higher than a predefined part A of Pmax (for example 95%), then a subset S of online loads with lowest priorities and present total power consumption P is set offline to reduce the total consumption to lower than predefined part B of Pmax (for example 90%).

If the total load (Pload) is lower than a predefined part D of Pmax (for example 60%), then a subset S of offline loads with highest priorities and total estimated power consumption P is set online to increase the total consumption. The subset S is defined to increase the total consumed power to a level higher than predefined part B of Pmax (for example 70%) and not higher than part A of Pmax. It allows maximizing a number of loads able to work with a limited power source.

Coefficients A, B, C, and D are selected with respect to the following rule: $0<D<C<B<A<1.0$.

Historical data is used to estimate a power consumption of the loads that are supposed to be turned on. A load could cycle and/or have a significant in-rush current, so if the load was not consuming power just before being switched offline, it would be in the OFF stage of cycling and would consume significant power if suddenly brought online. Historical data would provide information on expected consumption from that load, particularly if an in-rush current is expected.

One difficulty in defining a correct set of the loads is the unknown state of the load after it has been in the OFF state for an extended period of time. While in the OFF state, the load could be changed by customer. For example, someone could switch a burner of the kitchen range on when the range was off, or the load can change itself (such as in the case where a refrigerator detects a temperature rise and tries to switch on). In both cases, the power consumed by a load after some OFF period of time could be different from power consumed just before it had been shut down. Therefore, the power that would be consumed by the load if it were switched ON needs to be estimated or predicted. A neural network predictor could be applied to predict the behavior of the particular load.

The adaptive load management algorithm 600 takes a maximum steady (not in-rush) current observed earlier as estimates, and defines a set of loads for putting online considering estimated load, priority of the loads, and power supply sources 110, 112, or 114. Loads are then put online one by one with a short interval to reduce step-load effect. If the resulting power is still under a desired level, the process will be repeated until an optimal level is achieved.

The adaptive load management algorithm 600 also assists in starting up loads having a large in-rush current. To help to start such a load, the algorithm 600 briefly, for a second or two, shuts down all but the most important loads, starts the load in question with a large in-rush current, and finally puts all recently disconnected loads back online. This optional function can benefit systems working in hot climate regions, where the inconvenience of a brief shutdown of some devices would be much less important than the ability to run an air-conditioning unit from a backup power source 114, such as the generator 115.

Each state of the state machine of the adaptive load management algorithm 600 can have its own algorithm for initialization and operation. For example, the UPS state (FIG. 6) begins operation by shutting down all load branches to prevent an overload of the emergency power source 114 when it comes online.

On entry, the Full Power state does not switch all loads ON at the same time, but instead switches them ON one by one to reduce step-loading of the utility power source 110 with a cumulative in-rush current. The Full Power state collects the historical data on consumed power for individual loads. It also communicates with any available "smart loads" to reduce peak power by intelligent scheduling or time-sharing.

The Generator state provides adaptive load management, or allows the user to choose what set of loads can be ON when a backup power source 114 is providing power. These sets could be predefined by the user or by the installer.

The Shedding state can utilize a time sharing to comply with a request from a power utility 109 for reducing consumed power.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of facilitating communication across open contacts of a circuit breaker comprising:
    connecting a communications interface across contacts of said circuit breaker such that said communications interface includes a repeater connected between a closed communication path on the line side of a circuit to which said circuit breaker is connected and a closed communication path on the load side of said circuit; and
    passing signals, via said communications interface, between the line side closed communication path and the load side closed communication path of said circuit regardless of whether said contacts are open or closed.

2. The method of claim 1, wherein both of the line and load side closed communication paths are bi-directional.

3. The method of claim 1 wherein the communications interface includes a power line coupler for receiving said signals and a power line coupler for sending said signals in each of the line and load side closed communication paths and a neutral conductor interface.

4. The method of claim 1, further comprising detecting which of at least two states said contacts are in, said at least two states being open and closed.

5. The method of claim 1, wherein the communications interface is an active communications interface in that it both receives and transmits signals.

6. The method of claim 1, wherein said communications interface is a power line communication (PLC) module.

7. The method of claim 1, wherein said signals include power line communication (PLC) messages.

8. The method of claim 1, wherein said signals include Ethernet-formatted packets.

9. The method of claim 1, further comprising connecting said communications interface to a DC voltage supply.

10. The method of claim 1, further comprising:
    operatively coupling a controller to said communications interface; and
    programming said controller to receive and transmit said signals through said communications interface between the load side closed communication path and the line side closed communication path of said circuit.

11. The method of claim 10, further comprising coupling said controller to a motor operatively coupled to said contacts, and farther programming said controller to move said contacts between an open and a closed position via said motor.

12. The method of claim 10, farther comprising connecting said controller to a DC voltage supply housed within said circuit breaker.

13. The method of claim 10, wherein said controller includes a sensing circuit configured to receive signals representative of the current flowing through the load side of said circuit to which said circuit breaker is connectable.

14. The method of claim 10, wherein said controller is further programmed to dynamically alter a fault threshold level of said circuit breaker.

15. The method of claim 10, wherein said controller is further programmed to dynamically alter an operational current threshold level of said circuit breaker.

16. The method of claim 10, wherein said controller is further programmed to dynamically adjust a trip threshold of said circuit breaker.

17. The method of claim 10, wherein said controller is further programmed to cause said contacts to open in response to receiving a power line communication (PLC) message communicated through said communications interface from the line side closed communication path of said circuit.

18. The method of claim 17, wherein said controller causes said contacts to open based on criteria selected from. the group consisting of occupancy, cost of power, time-of-day pricing, and real-time pricing.

19. The method of claim 10, wherein said controller is further programmed to detect an imminent brownout condition on the line side of said circuit and, in response thereto, cause said contacts to open.

20. The method of claim 10, further comprising further programming said controller to sequence at least one interruptible load connected to said circuit based on an adaptive load management algorithm.

21. The method of claim 10, further comprising further programming said controller to execute an adaptive load management algorithm to temporarily shut down at least one interruptible load connected to said circuit to provide extra power for a high in-rush current toad connected to another circuit.

22. The method of claim 10, further comprising further programming said controller to execute an adaptive load management algorithm to cause said contacts to open or close based on a priority associated with a load connected to said circuit.

23. The method of claim 10, wherein said controller is further programmed to cause said contacts open during at least a portion of a high energy cost time period.

24. The method of claim 10, wherein said controller is further programmed to substantially predict the behavior of at least one load connected to said circuit using a neural network predictor algorithm.

25. The method of claim 10, wherein said controller is further programmed to manage adaptively loads connected to said circuit when said circuit is powered by a backup power supply.

26. The method of claim 1, wherein the line side closed communication path includes a utility power source, at least one power line coupler on the power source side of the circuit breaker contacts, a neutral conductor interface arid the communications interface and the load side closed communication path includes the load, at least one power line coupler on the load side of the circuit breaker contacts, a neutral conductor interface and the communications interface.

* * * * *